United States Patent [19]
Heanue et al.

[11] Patent Number: 5,940,514
[45] Date of Patent: Aug. 17, 1999

[54] ENCRYPTED HOLOGRAPHIC DATA STORAGE BASED ON ORTHOGONAL PHASE CODE MULTIPLEXING

[75] Inventors: John F. Heanue, San Mateo; Matthew C. Bashaw, Menlo Park; Lambertus Hesselink, Woodside, all of Calif.

[73] Assignee: The Board of Trustees of the Leland Stanford Junior University, Stanford, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/643,115

[22] Filed: Apr. 30, 1996

[51] Int. Cl.$^6$ ....................................... H04K 1/00
[52] U.S. Cl. .................... 380/49; 359/7; 359/11; 369/102; 380/6
[58] Field of Search ........................... 380/6, 49; 359/11, 359/10, 22, 29; 369/102, 103

[56] References Cited

U.S. PATENT DOCUMENTS

| | | | |
|---|---|---|---|
| 3,519,322 | 7/1970 | Brooks et al. | 350/3.5 |
| 3,612,641 | 10/1971 | Eaglesfield | 350/3.5 |
| 3,620,590 | 11/1971 | Barker | 350/3.5 |
| 3,711,177 | 1/1973 | Ward | 250/220 |
| 4,037,918 | 7/1977 | Kato | 350/3.5 |
| 4,120,569 | 10/1978 | Richard, Jr. | 350/3.68 |
| 4,143,937 | 3/1979 | Yonezawa | 350/3.82 |
| 4,892,370 | 1/1990 | Lee | 350/3.74 |
| 4,927,220 | 5/1990 | Hesselink et al. | 350/3.64 |
| 4,972,480 | 11/1990 | Rosen | 380/46 |
| 5,235,439 | 8/1993 | Stoll | 359/7 |
| 5,377,176 | 12/1994 | Redfield | 369/103 |
| 5,550,779 | 8/1996 | Burr et al. | 365/216 |
| 5,627,664 | 5/1997 | Trisnadi | 359/11 |
| 5,715,316 | 2/1998 | Steenblik et al. | 380/54 |

FOREIGN PATENT DOCUMENTS 2196443  4/1988  United Kingdom .

OTHER PUBLICATIONS

Denz, C. et al., Volume hologram multiplexing using a deterministic phase encoding method, Optics Communications, 85, pp. 171–176, 1991.

Denz, C. et al., Potentialities and limitations of hologram multiplexing by using the phase encoding technique, Appl. Optics, 31(26), pp. 5700–5705, 1992.

Taketomi, Y. et al., Incremental recording for photorefractive hologram multiplexing, Optics Letter, 16(22), pp. 1774–1776, 1991.

Bashaw et al., Cross–talk considerations for angular and phase–encoded multiplexing in volume holography, J. Opt. Soc. Am. B., 11(9), pp. 1820–1836, 1994.

(List continued on next page.)

*Primary Examiner*—David C. Cain
*Attorney, Agent, or Firm*—Lumen Intellectual Property Services

[57] ABSTRACT

An encryption method and apparatus for holographic data storage are disclosed. In a system using orthogonal phase-code multiplexing, data is encrypted by modulating the reference beam using an encryption key K represented by a unitary operator. In practice, the encryption key K corresponds to a diffuser or other phase-modulating element placed in the reference beam path, or to shuffling the correspondence between the codes of an orthogonal phase function and the corresponding pixels of a phase spatial light modulator. Because of the lack of Bragg selectivity in the vertical direction, the phase functions used for phase-code multiplexing are preferably one dimensional. Such phase functions can be one-dimensional Walsh functions. The encryption method preserves the orthogonality of reference beams, and thus does not lead to a degradation in crosstalk performance.

14 Claims, 4 Drawing Sheets

OTHER PUBLICATIONS

Krasnov, A., Thick–film phase holograms recorded by means of coded reference waves, Sov. J. Quantum Electron, 7(9), pp. 1147–1148, 1977.

Hong, J. et al., Volume holographic memory systems: techniques and architectures, Op. Eng., 34(8), pp. 2193–2203, 1995.

Heanue, J. et al., Volume holographic storage and retrieval of digital data, Science, 265, pp. 749–752, 1994.

Heanue, J. et al., Recall of linear combinations of stored data pages based on phase–code multiplexing in volume holography, Optics Letters, 19(14), pp. 1079–1081, 1994.

Taketomi, Y. et al., Multi–mode operations of a holographic memory using orthogonal phase codes, MD2–1, pp. 126–129.

Javidi, B. et al, Optical pattern recognition for validation and security verification, Op. Eng., 33(6), pp. 1752–1756, 1994.

ENCRYPTED HOLOGRAPHIC DATA STORAGE BASED ON ORTHOGONAL PHASE CODE MULTIPLEXING

This invention was made with U.S. Government support under Grant No. N00014-92-J-1903, award by ARPA. The U.S. Government has certain rights in this invention.

FIELD OF THE INVENTION

The present invention relates to the field of holographic data storage, and in particular to a method of encrypted data storage based on orthogonal phase code multiplexing.

BACKGROUND—DESCRIPTION OF PRIOR ART

Since the development of off-axis holography in the 1960's, volume holography has been identified as a candidate for high density data storage. Theoretically, up to $10^{14}$ bits of information can be stored in 1 cm$^3$ of a volume holographic medium. In addition, holographic storage promises fast data transfer rates, estimated at over 1 Gb/s. An underlying reason for the fast performance of holographic storage systems is that thousands of data bits are stored together in pages, rather than individually on a track. For information on holographic memory systems, see for example the articles by Heanue et al. in Science 265: 749–752 (1994), Hong et al. in Opt. Eng. 34(8): 2193–2203 (1995), and Psaltis and Mok in Scientific American 273(5): 70–78 (1995), or U.S. Pat. No. 4,927,200 (Hesselink et al.).

Briefly, in a typical volume holographic storage system data is stored in a photorefractive medium such as a lithium niobate (LiNbO$_3$) or strontium barium niobate (SBN) crystal. The data is encoded as a page in a coherent signal beam that is allowed to interfere with a coherent reference beam within the recording medium; the interference pattern corresponding to a page is stored throughout the medium. For readout, only the reference beam is sent through the medium, and the interaction of the reference beam with the stored interference pattern produces a signal beam proportional to the beam originally used to store the pattern.

Several approaches have been used for multiplexing, or storage of multiple pages within a system. Typical approaches include angular, wavelength and phase-code multiplexing. One of the major concerns in mutiplexed holographic storage is the crosstalk between stored images. For a review of crosstalk considerations in holographic storage systems, see for example the article by Bashaw et al. in J. Opt. Soc. Am. B 11: 1820–1836 (1994), which is herein incorporated by reference.

In many data storage applications it may be desirable to prevent unauthorized access to the stored data. Secure data storage can be accomplished by encrypting the data itself, using known digital algorithms; a recovered data stream is then meaningless to a user without deciphering capability. In holographic systems it is also possible to encrypt data without processing the data itself. That is, secure storage of a data page can be achieved by encrypting the reference beam.

U.S. Pat. No. 3,711,177 describes encrypting data in a two-dimensional hologram on an ID card. Encryption is achieved by placing a random phase mask in the reference beam path. The same mask is then required for readout. Other patents discussing holographic encryption by phase-modulating the reference beam include U.S. Pat. Nos. 3,519, 322 and 3,620,590, and UK patent 2,196,443B. The above-mentioned patents discuss encrypting single holograms, but do not address multiplexing or crosstalk considerations.

In an article in Sov. J. Qu. Elec. 7: 1147 (1977), Krasnov proposed random phase-code multiplexing, a technique wherein a different random phase mask is placed in the reference beam path for each hologram stored. This multiplexing technique allows secure data storage. However, the amount of data required to describe a large number of masks can be comparable to, or even exceed, the amount of data to be stored. Also, the reference beams in a random phase code system are in general not orthogonal, and the crosstalk performance of such a system is not optimal. The crosstalk problem is especially pronounced in random phase code systems using a small number of discrete elements comprising the mask, such as systems using phase spatial light modulators (PSLM).

OBJECTS AND ADVANTAGES OF THE INVENTION

In light of the above, it is a primary object of the present invention to provide a method of encrypted data storage in a multiplexed holographic system. It is another object of the present invention to provide an encryption method that does not degrade the crosstalk performance of the holographic storage system. It is yet another object of the present invention to provide, in a multiplexed holographic storage system, an encryption method requiring a relatively small amount of data required to describe the encryption key. These and other objects and advantages will become more apparent after consideration of the ensuing description and the accompanying drawings.

SUMMARY OF THE INVENTION

In a method of the present invention, a data page $S_m$ is stored using a reference beam $R_m$ whose wavefront is modulated using a phase function $W_m$ and an encryption key K. A second page $S_{m+v}$ is then stored using a reference beams $R_{m+v}$ whose wavefront is modulated using a second phase function $W_{m+v}$ and the encryption key K. The encryption key K specifies phase delays added to components of the reference beams. It is preferred, for crosstalk considerations, that $W_m$ and $W_{m+v}$ be orthogonal functions, and that the encryption key K not destroy the orthogonality of the reference beams. It is also preferred that $W_m$ correspond to an array of pixel rows, where adjacent rows are separated by an angular separation larger than the vertical angular bandwidth of the signal beam. Preferably, $W_m$ and $W_{m+v}$ are orthogonal Walsh functions. In a preferred embodiment, K is represented by a device such as a difusser, i.e. a device capable on imparting uncorrelated phase delays on parts of a reference beam. In another preferred embodiment, K represents a set of phase delays imparted on parts of a reference beam by the same spatial light modulator used to generate the orthogonal phase functions.

BRIEF DESCRIPTION OF THE DRAWINGS

FIG. 1-A is a schematic perspective view of an arrangement for phase-code mutiplexing images in a holographic storage medium, according to the present invention.

FIG. 1-B is a top view of the arrangement in FIG. 1-A.

FIG. 2-A shows two pixels of a PSLM having different associated phase delays, used for the storage of an image.

FIG. 2-B shows two pixels of a PSLM having identical associated phase delays.

FIGS. 3-A through 3-H show eight one-dimensional Walsh functions and their pixel correspondents, according to the present invention.

FIG. 5-A illustrates the presence of Bragg selectivity in the horizontal direction, according to the present invention.

FIG. 5-B illustrates the absence of Bragg selectivity between adjacent codes in the vertical direction, according to the present invention.

FIG. 6-A shows a multiplexed digital encrypted image recalled with the correct key, according to the present invention.

FIG. 6-B shows a second multiplexed digital encrypted image recalled with the correct key, according to the present invention.

FIG. 6-C shows the noise resulting from recall with an incorrect key, according to the present invention.

DESCRIPTION

In the following discussion, for some quantity A, the notation $A_m$ is understood to correspond to some (fixed) m, while the notation $\{A_m\}$ is understood to mean a set of $A_m$ having varying values of m. Likewise, $A^{(m)}_n$ is understood to imply that both m and n are fixed, while $\{A^{(m)}_n\}$ is understood to mean a set of $A^{(m)}_n$, where at least one of the indices m or n is varying. The notation $\{A^{(m)}_{t1,n}\}$ is understood to mean a set of $A^{(m)}_{t1,n}$ for a fixed t1 and varying n.

The statement that the wavefront of a beam is modulated using a phase function is understood to mean that the phase function specifies a set of phase delays that are imparted on parts or components of the beam. A component of a beam is understood to include, but not be restricted to, a plane wave component of the beam. The statement that the wavefront of a beam is modulated using an encryption key is understood to mean that the encryption key specifies a set of encryption phase delays that are imparted on parts/components of the beam, or a correspondence between the elements of a phase function and parts of the beam.

The distinction between a phase function and an encryption key is a formal one: it is understood that an unauthorized decoder can be aware of the identity of a phase function, but not of the identity of the encryption key. In practice, a phase function acts in combination with the encryption key to impart to the reference beam a phase modulation that is unknown to an unauthorized decoder.

ORTHOGONAL PHASE CODE MULTIPLEXING

Orthogonal phase code multiplexing offers a number of advantages over angular and wavelength multiplexing, including the possibility of implementation with fixed geometry and wavelength, and the possibility of performing arithmetic operations on the stored data by modulating the reference beam. For further information on orthogonal phase-code multiplexing, see for example U.S. Pat. No. 3,612,641, or articles by Denz et al. in *Opt. Comm.* 85: 171 (1991), Taketomi et al. in *Opt. Lett.* 16: 1774 (1991), and Taketomi et al. in 1991 *OSA Topical Meeting on Photorefractives,* Beverly, Mass., p. 126 (1991). As will be apparent from the description below, orthogonal phase code multiplexing also allows encryption of reference beams that preserves reference beam orthogonality, and thus does not lead to a degradation in crosstalk performance.

Figure 1:
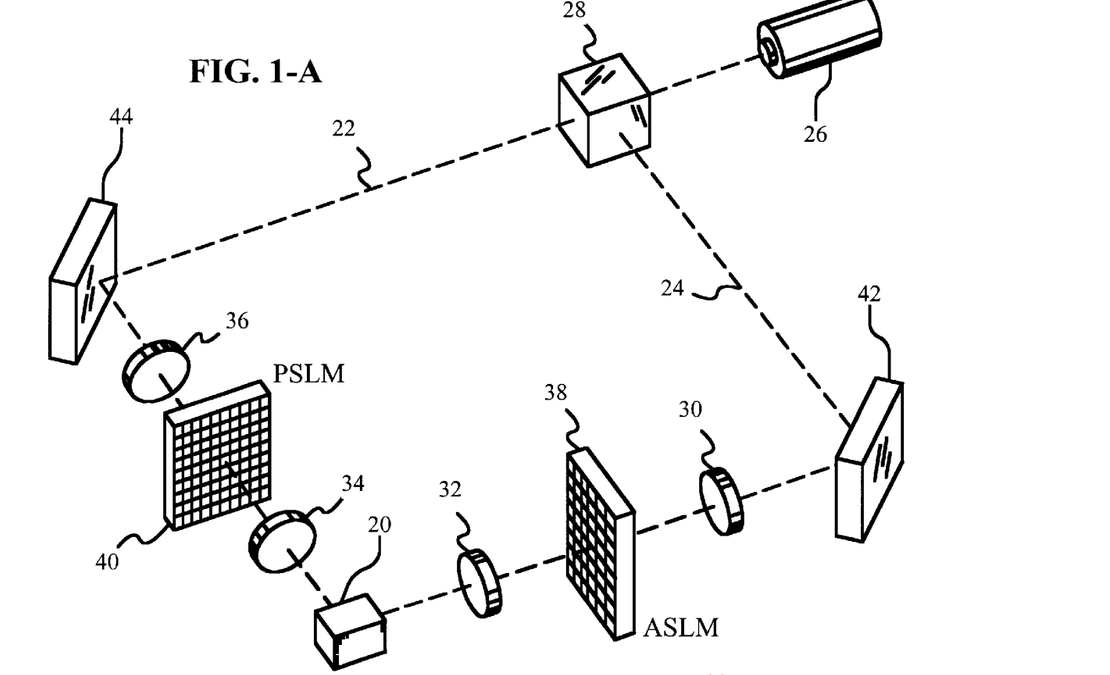

FIG. 1 shows a setup for a holographic storage system that can be used for phase-code multiplexing. Information is recorded in a recording medium 20 as an interference pattern produced by a reference beam 22 and a signal beam 24. Signal beam 24 contains the information (e.g. data pages) to be stored. A coherent light source such as a laser 26 generates a beam that is split by a beam splitter 28 into reference beam 22 and signal beam 24. Beams 22 and 24 pass through the lenses 30, 32, 34, 36 and the spatial light modulators (SLMs) 38, 40, and are reflected by the mirrors 42, 44. Ways of arranging lenses and mirrors for spatially manipulating and Fourier transforming beams are well known in the art. The pages are observed using a CCD camera 46. Preferably, reference beam 22 is perpendicular to signal beam 24 within holographic medium 20, so as to minimize crosstalk due to Bragg-mismatched reconstruction.

Information is encoded in signal beam 24 using an Amplitude Spatial Light Modulator. (ASLM) 38, which selectively modulates the amplitude of light incident on its pixels. The wavefront of reference beam 22 is modulated using a Phase Spatial Light Modulator (PSLM) 40. PSLM 40 selectively alters the phase (but not amplitude) of light passing through its pixels $p_j$. PSLM 40 is preferably placed a distance f from lens 34, where f is the focal length of lens 34; if the pixels of PSLM 40 are thought to be approximately point sources, such a placement effectively Fourier transforms the pixels of PSLM 40 into plane waves.

Figure 2:
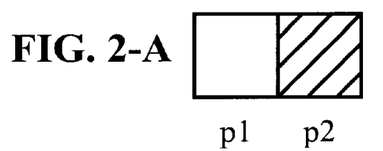

An intuitive understanding of phase-code multiplexing can be achieved with reference to the two-element phase functions illustrated in FIGS. 2-A and 2-B. Each element of a phase function corresponds to a pixel $p_1$ or $p_2$ of a PSLM placed in the reference beam path. The pixels $p_1$ and $p_2$ alter the phase (but not amplitude) of light passing though them. In FIG. 2-A, the phase of light passing through $p^{(A)}_1$ is unaltered, while the phase of light passing through $p^{(A)}_2$ is modified by $\pi$. In FIG. 2-B, the phase of light passing through $p^{(B)}_1$ and $p^{(B)}_2$ is unaltered.

Consider an image I stored with the phase function shown in FIG. 2-A. Accessing the recording medium with the same phase function will result in a reconstruction of I. The signal component reconstructed using $p^{(A)}_1$ interferes constructively with the signal component reconstructed using $p^{(A)}_2$. The constructive interference of the signal components results in the reconstruction of I at the detector. Accessing the medium with the phase function shown in FIG. 2-B, however, will result in a zero net signal, since the signal reconstructed using $p^{(B)}_2$ will be out of phase with the signal reconstructed using $p^{(B)}_1$. The net output signal is therefore zero. A second image II can then be stored using the phase function in FIG. 2-B. Accessing the recording medium with the phase function in FIG. 2-A will result in a reconstruction of image I, while accessing the medium with the phase function in FIG. 2-B will result in a reconstruction of image II.

Orthogonal phase code multiplexing is an extension of the above example to phase functions having N elements. If any two functions in the orthogonal set are compared, half the elements will be different and half the elements will be the same between the two functions. Suppose an image is stored using one of the N-element phase functions. If readout is performed with a different (orthogonal) N-element phase function, the signals reconstructed with the N/2 elements that are the same as in the original function will interfere destructively withh the signals reconstructed with the N/2 elements that are different. Thus, accessing the medium with any function orthogonal to the function used to store a given image will not result in the reconstruction of that image.

The preceding examples can be better understood by considering the formal discussion below. Each reference beam can be considered to consist of N plane-wave components:

$$R_m(x) = \sum_{n=1}^{N} r_n^m \exp(i(k_n \cdot x - \omega t + \varphi_n^m)) + c.c. \quad [1]$$

where $r_n^m$ and $\phi_n^m$ are the amplitude and the phase, respectively, of the nth component of the mth reference beam and c.c. represents the complex conjugate. The geometry is fixed, i.e. each reference beam has the same number of plane-wave components; the amplitude and the phase, but ideally not direction, of these components vary. In practice, each plane wave component is the Fourier transform of a pixel of PSLM 40. That is, the phases $\{\phi_n^m\}$ are controlled by a phase function $W_m$ specifying the phase delays of the pixels of PSLM 40. The phase function $W_m$ has phase elements $\{w^{(m)}_n\}$; a phase element $w^{(m)}_n$ specifies the phase delay for a pixel $P_{j(n)}$ of PSLM 40. If the pixels $p_j$ are approximated as points in the Fourier transform arrangement shown in FIG. 1-B, then $\{w^{(m)}_n\}$ are equal to $\{\phi_n^m\}$ for some choice of origin.

With the convention that, for any vector $|A\rangle$, $$\langle x|A\rangle = A(x) = \sum_{n=1}^{N} a_n \exp(ik_n \cdot x) \quad [2]$$

and expressing reference beams by n-element vectors as $$|R_m\rangle = |r_1^m \exp(i\phi_1^m), \ldots, r_N^m \exp(i\phi_N^m)\rangle \quad [3]$$

the output signal when a reference beam $|R_p\rangle$ is used to readout an image $|S_m\rangle$ previosly stored with a beam $|R_m\rangle$ is:

$$|S_{out}\rangle = \sum_{m=1}^{M} \langle R_m|\hat{B}^m|R_p\rangle |S_m\rangle \quad [4]$$

where the matrix $\hat{B}^m$ is described in more detail in the article by Heanue et al. in *Opt. Lett.* 19 (14): 1079–1081 (1994), which is herein incorporated by reference.

If Bragg-mismatched reconstruction and spatial frequency dispersion are negligible, and all gratings are recorded to the same strength, the matrix $\hat{B}^m$ is equal to a constant $B_o$ times the identity matrix. The output signal then becomes:

$$|S_{out}\rangle = B_0 \sum_{m=1}^{M} \langle R_m|R_p\rangle |S_m\rangle. \quad [5]$$

The reference beams can be chosen to be orthonormal, i.e. such that $\langle R_m|R_p\rangle = \delta_{mp}$, where $\delta_{mp}$ is the Kronecker delta function.

Choosing orthogonal reference beams $\{R_m\}$ is equivalent to choosing orthogonal phase functions $\{W_m\}$. For example, the reference beams can be modulated using Walsh functions. For more information on Walsh functions, see for example K. G. Beauchamp, *Applications of Walsh and Related Functions,* Academic Press, London, 1984. In general, there are N distinct orthogonal functions in a set of N-element Walsh functions. For two arbitrary different functions in a N-element set, exactly N/2. pixels are identical in the two functions, and exactly N/2 pixels are different between the two functions.

Figure 3:
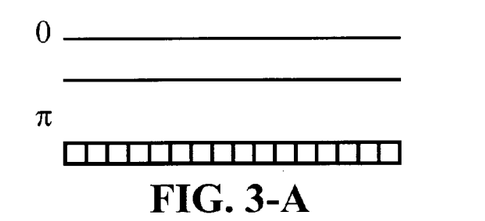

Constructing a set of Walsh functions is well known in the art, and can be done for example by linearly combining Rademacher functions $\text{sign}[\sin(2^n \pi x)]$. FIGS. 3-A through 3-H show eight one-dimensional Walsh functions, and corresponding pixel representations. The first function (having all elements equal) is not suitable for use in one embodiment of the present invention.

Figure 4:
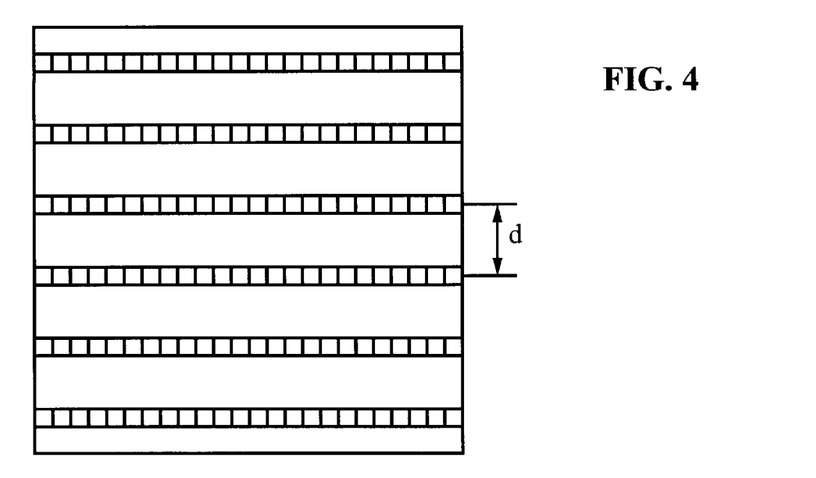
FIG. 4 shows six rows of pixels corresponding to a wave function $W_m$, where adjacent rows are separated by a distance d, according to the present invention.

In a preferred embodiment, a phase function $W_k$ is a one-dimensional Walsh function, rather than a two-dimensional one. That is, the phase function corresponds to rows of pixels, rather than to a two-dimensional array of pixels. FIG. 4 shows several rows of pixels separated by a distance d. Preferably, the set of rows in a page of PSLM 40 comprises a Walsh function. It is also possible for each row to represent a Walsh function. The crucial requirement, for crosstalk purposes, is only that the pages of PSLM 40 be orthogonal.

For clarity, in the following discussion the plane defined by the reference beam and the signal beam is understood to be the horizontal plane. Separating adjacent rows of pixels may be desirable in some systems due to the different Bragg selectivities in the horizontal and vertical directions.

Figure 5:
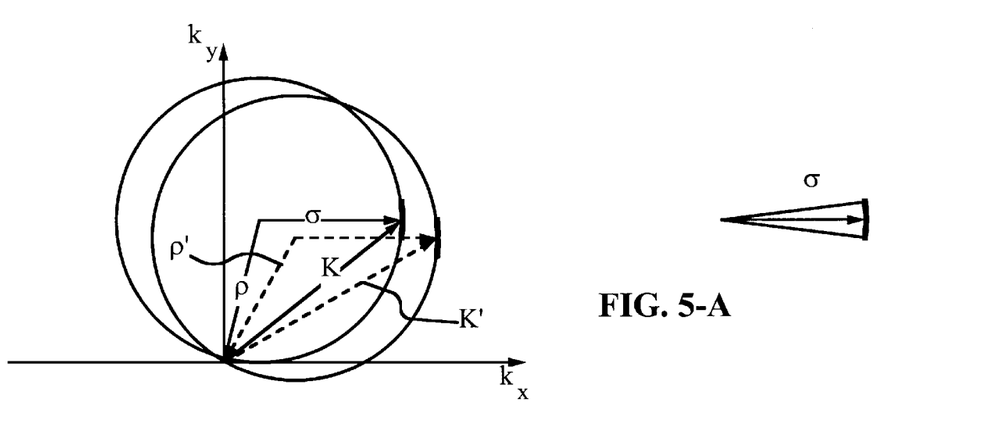

Consider two pixels p and p', adjacent on a row of PSLM 40. The reference beam will have a plane wave component with a wave vector ρ corresponding to p, and a component with a wave vector ρ' corresponding to p'. Consider a signal beam having plane wave components with wave vectors denoted collectively σ, where it is understood that the orientations of σ span a range, as shown in the k-space diagrams of FIG. 5-A. For simplicity, the orientations of σ are shown to vary only within the horizontal plane. FIG. 5-A also shows grating vectors collectively denoted K, recorded by the interference of the signal beam and the part of the reference beam corresponding to pixel p. A second set of grating vectors K' is recorded by the interference of the signal beam and the part of the reference beam corresponding to pixel p'. Note that the gratings corresponding to p and p' are recorded in distinct, non-overlapping regions in k-space.

Consider now two closely-spaced pixels p and p", adjacent on a column of PSLM 40. Consider a signal beam having plane wave components σ whose orientations span ranges in the horizontal and vertical directions, as shown in the k-space diagrams of FIG. 5-B. The grating K corresponding to p is recorded in a region of k-space overlapping with that used to record the grating K" corresponding to p". That is, if a page S is stored using only pixel p, recall using pixel p" will result in a reconstruction of S.

Therefore, it is preferred that the distance d between adjacent rows of pixels on PSLM 40 be large enough so that the angular separation between adjacent rows is at least as large as the vertical angular bandwidth of the signal beam. Gratings corresponding to adjacent rows are then reconstructed in non-overlapping regions of the output plane.

ENCRYPTION

Encrypting a reference beam $|R_m\rangle$ is equivalent to generating a new reference beam $$|R'_m\rangle = K|R_m\rangle \quad [6]$$

where K is an operator representing an encryption key. That is, K transforms a reference beam $|R_m\rangle$ into the reference beam $|R'_m\rangle$. The exact form of K will depend on the basis set chosen to represent the reference beam, and on the encryption scheme. It is important, nevertheless, that K preserve the orthogonality of the reference beams, i.e. that K be a unitary operator.

In a preferred embodiment, an encryption key K adds a random phase to each plane wave component of $|R_m>$. Consider a reference beam $|R_m>$ according to eq. [1]. Using the basis set defined by eq. [3], K is represented by a diagonal matrix operator having elements $K_{nn}=\exp(i\epsilon_n)$, where $\epsilon_n$ is the random phase added to the nth plane wave component. Since K is unitary, $<R'_m|R'_p>=\delta_{mp}$ for any m, p, and thus the encrypted reference waves satisfy the requirements of orthogonal phase code multiplexing. Furthermore, $<R_m|R'_p>\neq\delta_{mp}$ and $\overline{<R_m|R'_p>}=0$, and thus readout is not possible unless the correct reference beam is used, i.e. unless the correct random phase is added to each plane wave component; Unlike in the case of random phase code multiplexing, only one encryption key K is needed to store all the data pages.

The effectiveness of an encryption scheme such as the one described above can be evaluated by examining the signal to noise ratio (SNR) when an incorrect key is used. The SNR is given by $$SNR = \frac{\overline{|A_S|^2}}{(\overline{|A_D|^2} - \overline{|A_S|^2})} \quad [7]$$

where $A_D$ is the amplitude of the signal when a random incorrect key is used, $A_S$ is the amplitude of the signal when the correct key is used, and the overlines indicate expectation values. For both correct and incorrect keys, $|A|^2 = <S_{out}|S_{out}>$.

When the error in the phase of each element is small, the SNR is $$SNR = \frac{N}{M\overline{\epsilon^2}} \quad [8]$$

where N is the number of plane wave components (or pixels used for encryption), M is the number of multiplexed pages, and $\overline{\epsilon^2}$ is the variance of the phase error. Equation [8] also gives the crosstalk-limited SNR in an orthogonal phase code multiplexed holographic system limited by phase error.

When the phase errors are uniformly distributed over the entire range $(0, 2\pi)$, as would be expected if an incorrect key is used, the SNR is $$SNR = \frac{N}{M}. \quad [9]$$

When the number of constituent plane wave components in each reference beam is equal to the number of multiplexed pages, the SNR approaches one. Equation [9] also gives the crosstalk-limited SNR in a holographic system using random phase code multiplexing.

It is important to note that an operator representing K is not restricted to be diagonal. If a non-diagonal form of K is used, orthogonal bi-phase codes can be converted into phase-and-amplitude codes, for example. A special case is when each row or column in the matrix representation of K contains one element equal to 1, with the remaining elements in the row or column equal to 0. This matrix corresponds to shuffling the code elements among the available plane wave components.

Consider the phase codes (the elements of a phase function $W_m$) shown in FIGS. 3-A through 3-H. There is a natural numbering of these codes, for example such that Walsh functions defined in terms of the numbering have the form shown in FIGS. 3-A through 3-H. There is an independent natural numbering of the pixels of PSLM 40; for example, the top-left pixel can be numbered to be pixel 1, and so on. There is no restriction that the code numbering correspond exactly to the pixel numbering, i.e. that code number 1 correspond to pixel number 1, and so on.

The encryption achieved by randomnly shuffling the phase code-pixel correspondence, without the addition of any random phases, can be understood by considering a Walsh function as the original, unencrypted function. Each Walsh function of N elements (except the one having all its phase elements equal) consists of N/2 elements equal to 1 (corresponding to a phase delay of 0) and N/2 elements equal to −1 (corresponding to a phase delay of $\pi$). If the correspondence between the phase elements of $W_k$ and pixels $p_j$ is unknown, an unauthorized attempt to readout a given page is equivalent to an attempt to guess the pixel location of N/2 elements equal to 1, out of N pixels. The number of N-element vectors with N/2 elements equal to 1 and N/2 elements equal to −1 is N choose N/2. Using Stirling's approximation for the logarithm of N! gives an estimate (for large N) for the probability P of correctly guessing a phase code:

$$P \approx \frac{N}{2^N}. \quad [10]$$

The number of tries required in a brute force decoding attempt varies for large N as $2^N$, which makes brute force decoding impractical for typical values of N (on the order of hundreds or thousands).

As discussed in the above-incorporated paper by Heanue et al. in *Opt. Lett.* 19 (14): 1079–1081 (1994), in a phase-code multiplexed system readout using the sum of two orthogonal reference beams generates the sum of the two pages stored with each reference beam. Because the set of Walsh functions is a complete orthonormal set, any incorrect phase code vector can be expressed as a linear combination of the correct Walsh codes. The signal readout using an incorrect phase code is then an analog linear combination of stored data pages, which cannot be used to correctly extract information in a binary system.

A method of the present invention is implemented using an apparatus such as the one shown in FIG. 1-B. The apparatus comprises storage means for storing data pages $\{S_m\}$. In particular, the apparatus is capable of storing at least two images, an image $S_m$ and a second image $S_{m+v}$, $v\neq 0$, in a medium such as medium 20.

The apparatus also comprises encryption means for modulating a reference beam $R_m$ using an encryption key K and a phase function $W_m$, and for modulating a second reference beam $R_{m+v}$ using the key K and a second phase function $W_{m+v}$, where $W_{m+v}$ is orthogonal to $W_m$. Preferably, phase functions $\{W_m\}$ are orthogonal Walsh functions.

The encryption means comprises, in general, any means for selectively imparting phase delays on parts of a reference beam. In a preferred embodiment, the encryption means comprises a phase spatial light modulator having discrete elements (pixels). It is preferred that the PSLM be capable of imparting any phase modulation to light passing through its pixels. Such a PSLM is used to produce the phase delays corresponding to the combination of the encryption key and the phase functions. It is possible, however, to use a PSLM capable of imparting only zero or $\pi$ phase delays, if encryption is achieved by code-pixel shuffling.

In another preferred embodiment, the encryption means comprises a phase-modulating element having a multi-level or continuous (i.e. non-binary) phase structure. An example of a continuous phase-modulating element is a diffuser. A PSLM capable of producing phase delays other than 0 and π is an example of a multi-level element. In this embodiment, a 0–π (binary) PSLM is used to generate the phase functions, while the diffuser generates the encryption phase delays. Alternatively, a second PSLM can be used instead of a diffuser.

A phase function $W_m$ comprises a first set of phase elements $\{w^{(m)}_{t1,n}\}$, where t1 denotes a row of pixels $\{p_{t1,j}\}$ corresponding to $\{w^{(m)}_{t1,n}\}$. $W_m$ also comprises a second set of phase elements $\{w^{(m)}_{t2,n}\}$ corresponding to a second row of pixels $\{p_{t2,j}\}$. If the rows t1 and t2 are adjacent, it is preferred that the angular separation between the rows be at least as large as the angular bandwidth (in the vertical direction) of the signal beam.

Figure 6:
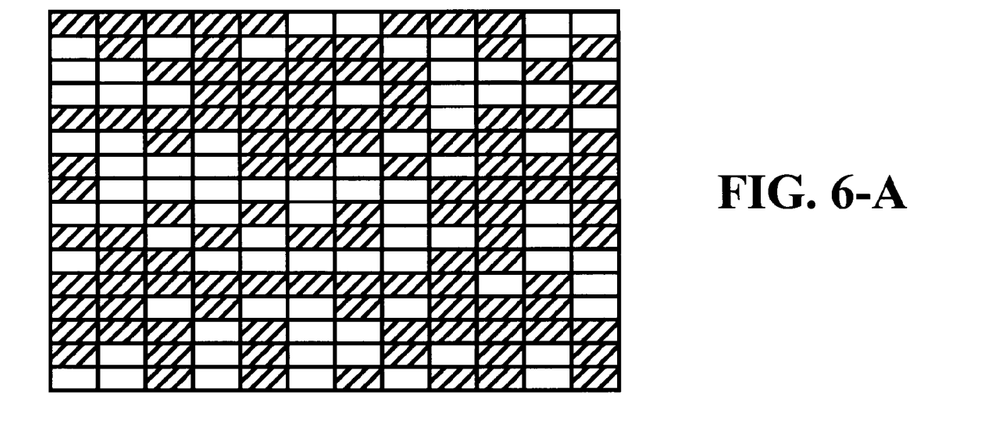

A setup similar to the one shown in FIG. 1-B was used to store data pages encrypted by placing a diffuser in the reference beam path. The phase functions used were orthogonal Walsh functions. The correlation length of the diffuser was less than the size of the pixels of PSLM 40, so that there is no correlation between the phases added to adjacent pixels. The diffuser remained in a fixed position for the entire recording process. FIGS. 6-A and 6-B illustrate schematically two binary data pages recalled with a correct key K, while FIG. 6-C illustrates schematically the noise resulting from recall with an incorrect key. The effect of using an incorrect key was demonstrated by shifting the position of the diffuser by a distance greater than its correlation length.

SUMMARY, RAMIFICATIONS, AND SCOPE

There are many ways to encrypt data for storage in a holographic medium, without departing from the spirit of the invention. For example, it is not necessary that the phase-codes correspond to individual pixels. Orthogonal sets of functions other than Walsh functions can be used for multiplexing. The phase functions can be, in general, two-dimensional, although one-dimensional phase functions are preferred in light of crosstalk considerations. Therefore, the scope of the invention should be determined, not by examples given, but by the appended claims and their legal equivalents.

We claim:

1. A method of encrypted holographic storage, comprising the steps of:
   a) generating a set of mutually orthogonal encrypted phase functions $\{W'_m\}$ by applying an encryption key K to a set of phase functions $\{W_m\}$; and
   b) storing in a holographic storage medium a set of data pages $\{S_m\}$, using corresponding mutually orthogonal encrypted reference beams $\{R'_m\}$ modulated by corresponding encrypted phase functions $\{W'_m\}$, wherein each of said reference beams $\{R'_m\}$ satisfies a Bragg-matching condition.

2. The method of claim 1 wherein said phase functions $\{W_m\}$ are Walsh functions.

3. The method of claim 1 wherein a row angular separation between said adjacent rows of pixels corresponding to said each of said phase functions $\{W'_m\}$ is larger than a column angular separation between adjacent columns of pixels corresponding to said each of said phase functions $\{W'_m\}$.

4. A method of encrypted holographic retrieval, comprising the steps of:
   a) generating a set of mutually orthogonal encrypted phase functions $\{W'_m\}$ by applying an encryption key K to a set of phase functions $\{W_m\}$; and
   b) retrieving from a holographic storage medium a set of data pages $\{S_m\}$, using corresponding mutually orthogonal encrypted reference beams $\{R'_m\}$ modulated by corresponding encrypted phase functions $\{W'_m\}$, wherein each of said reference beams $\{R'_m\}$ satisfies a Bragg-matching condition.

5. The method of claim 4 wherein said phase functions $\{W_m\}$ are Walsh functions.

6. The method of claim 4 wherein a row angular separation between said adjacent rows of pixels corresponding to said phase function $W'_m$ is larger than a column angular separation between adjacent columns of pixels corresponding to said phase function $W'_m$.

7. An encrypted holographic storage method comprising the steps of:
   a) using an encrypted reference beam $R'_m$ to store a data page $S_m$ in a holographic storage medium, wherein a wavefront of said reference beam $R'_m$ is modulated using an encryption key K and a phase function $W_m$ such that said reference beam $R'_m$ satisfies a Bragg-matching condition; and
   b) using an encrypted reference beam $R'_{m+v}$ to store a data page $S_{m+v}$ in said holographic storage medium, wherein a wavefront of said reference beam $R'_{m+v}$ is modulated using said encryption key K and a phase function $W_{m+v}$ such that said reference beam $R'_{m+v}$ satisfies said Bragg-matching condition, and such that said reference beam $R'_{m+v}$ is orthogonal to said reference beam $R'_m$.

8. The method of claim 7 wherein:
   a) said phase function $W_m$ comprises phase codes $\{w^{(m)}_n\}$ corresponding to pixels $\{p_j\}$ of a phase spatial light modulator; and
   b) said encryption key K specifies a value of n for each value of j.

9. An encrypted holographic retrieval method comprising the steps of:
   a) using an encrypted reference beam $R'_m$ to retrieve a data page $S_m$ from a holographic storage medium, wherein a wavefront of said reference beam $R'_m$ is modulated using an encryption key K and a phase function $W_m$ such that said reference beam $R'_m$ satisfies a Bragg-matching condition; and
   b) using an encrypted reference beam $R'_{m+v}$ to retrieve a data page $S_{m+v}$ from said holographic storage medium, wherein a wavefront of said reference beam $R'_{m+v}$ is modulated using said encryption key K and a phase function $W_{m+v}$ such that said reference beam $R'_{m+v}$ satisfies said Bragg-matching condition, and such that said reference beam $R'_{m+v}$ is orthogonal to said reference beam $R'_m$.

10. The method of claim 9 wherein:
    a) said phase function $W_m$ comprises phase codes $\{w^{(m)}_n\}$ corresponding to pixels $\{p_j\}$ of a phase spatial light modulator; and
    b) said encryption key K specifies a value of n for each value of j.

11. A method of encrypted holographic storage, comprising the steps of:
    a) using an encryption key to shuffle the correspondence between codes of orthogonal phase functions and pixels of a reference beam phase encoder; and
    b) storing multiple data pages in a holographic storage medium using orthogonal, Bragg-matched encrypted reference beams generated by encoding said orthogonal phase functions using said pixels.

12. A method of encrypted holographic retrieval, comprising the steps of:
   a) using an encryption key to shuffle the correspondence between codes of orthogonal phase functions and pixels of a reference beam phase encoder; and
   b) retrieving data pages from a holographic storage medium using orthogonal, Bragg-matched encrypted reference beams generated by encoding said orthogonal phase functions using said pixels.

13. An encrypted holographic storage method comprising the steps of:
   a) encrypting a phase function $W_m$ using an encryption key K to generate an encrypted phase-and-amplitude function $W'_m = KW_m$, wherein K is a unitary non-diagonal operator;
   b) generating an encrypted Bragg-matched reference beam $R'_m$ modulated by said encrypted phase-and-amplitude function $W'_m$, for storing a data page $S_m$ in a holographic storage medium;
   c) encrypting a phase function $W_{m+v}$ using said encryption key K to generate an encrypted phase-and-amplitude function $W'_{m+v} = KW_{m+v}$, wherein said phase function $W_{m+v}$ is orthogonal to said phase function $W_m$ such that said encrypted phase-and-amplitude function $W'_{m+v}$ is orthogonal to said encrypted phase-and-amplitude function $W'_m$; and
   d) generating an encrypted Bragg-matched reference beam $R'_{m+v}$ modulated by said encrypted phase-and-amplitude function $W'_{m+v}$, for storing a data page $S_{m+v}$ in a holographic storage medium, whereby said reference beam $R'_{m+v}$ is orthogonal to said reference beam $R'_m$.

14. An encrypted holographic retrieval method comprising the steps of:
   a) encrypting a phase function $W_m$ using an encryption key K to generate an encrypted phase-and-amplitude function $W'_m = KW_m$, wherein K is a unitary non-diagonal operator;
   b) generating an encrypted Bragg-matched reference beam $R'_m$ modulated by said encrypted phase-and-amplitude function $W'_m$, for retrieving a data page $S_m$ from a holographic storage medium;
   c) encrypting a phase function $W_{m+v}$ using said encryption key K to generate an encrypted phase-and-amplitude function $W'_{m+v} = KW_{m+v}$, wherein said phase function $W_{m+v}$ is orthogonal to said phase is function $W_m$ such that said encrypted phase-and-amplitude function $W'_{m+v}$ is orthogonal to said encrypted phase-and-amplitude function $W'_m$; and
   d) generating an encrypted Bragg-matched reference beam $R'_{m+v}$ modulated by said encrypted phase-and-amplitude function $W'_{m+v}$, for retrieving a data page $S_{m+v}$ from a holographic storage medium, whereby said reference beam $R'_{m+v}$ is orthogonal to said reference beam $R'_m$.

* * * * *